United States Patent Office 3,053,685

Patented Sept. 11, 1962

1

3,053,685

PIGMENTS

Helen Dolores Jamieson, Woodlands, Malpas, Newport, South Wales, assignor to Associated Lead Manufacturers Limited, London, England, a British company No Drawing. Filed Apr. 13, 1961, Ser. No. 102,650

Claims priority, application Great Britain Apr. 25, 1960

5 Claims. (Cl. 106—299)

This invention provides a stain or pigment for incorporation in glazes for ceramics. Such stains consisting of a mixture of tin oxide, whiting and potassium dichromate are known and confer on the glaze a pink colour. I have found that a stain which will impart an equally satisfactory colour to the glaze can be produced at a lower cost by substituting for part of the tin oxide zircon, i.e. cleaned and ground zircon ore.

The stain according to the invention consists of a calcined mixture of the following ingredients, parts being parts by weight:

| | Parts |
|---|---|
| Zircon | 10–20 |
| Tin oxide | 5–10 |
| Whiting | 3–10 |
| Potassium dichromate | 0.5–1.0 |

The invention includes a method of manufacturing such a stain in which the ingredients are subjected to calcination at a temperature between 1100° C. and 1400° C., washed with dilute mineral acid and then with water and finally calcined again at a temperature between 1100° C. and 1400° C.

In a typical case, the zircon, the tin oxide and the whiting are mixed in powdered form, a 5% solution of potassium dichromate is added to the mixed powders and the resulting paste is dried on a water bath with constant stirring.

The product is then sieved through a 100 mesh sieve B.S. and calcined at between 1100° C. and 1350° C. for one hour.

The calcine is then washed, once with 10% hydrochloric acid and twice with water, followed by drying at 120° C.

The mixture is recalcined at 1200° C. for one hour.

The following are examples of two typical stains according to the invention, the ingredients being given in parts by weight:

| | 1 | 2 |
|---|---|---|
| Zircon of 5 microns top particulate size | 16.5 | 10 |
| Tin oxide | 5.0 | 10 |
| Whiting | 6.75 | 6.3 |
| Potassium Dichromate | 0.825 | 0.77 |

A mill addition of about 6% by weight of a stain according to the invention to a zinc free glaze yields a clear red or pink colour. The glaze may conveniently be of the following composition:

| | Moles |
|---|---|
| Sodium and potassium oxides (together) | 0.3 |
| Calcium oxide | 0.4 |
| Barium oxide | 0.3 |
| Boric oxide | 0.6 |
| Alumina | 0.35 |
| Silica | 3.5 |

What I claim as my invention and desire to secure by Letters Patent is:

1. A stain for incorporation in glazes for ceramics which is constituted by a calcined mixture of the following ingredients 10–20 parts by weight of zircon, 5–10 parts by weight of tin oxide, 3–10 parts by weight of whiting and 0.5–10 parts by weight of potassium dichromate.

2. A glaze for ceramics which includes a stain as claimed in claim 1.

3. A stain as claimed in claim 1 in which the ingredients are 16.5 parts by weight of zircon, 5 parts by weight of tin oxide, 6.75 parts by weight of whiting and 0.825 part by weight of potassium dichromate.

4. A stain as claimed in claim 1, in which the ingredients are 10 parts by weight of zircon, 10 parts by weight of tin oxide, 6.3 parts by weight of whiting and 0.77 part by weight of potassium dichromate.

5. A method of manufacturing a stain for incorporation in glazes for ceramics, which includes the steps of calcining for one hour a mixture in powdered form of 10–20 parts by weight of zircon, 5–10 parts by weight of tin oxide, 3–10 parts by weight of whiting and 0.5–10 parts by weight of potassium dichromate at a temperature between 1100° C. and 1400° C., the zircon being present in the mixture as particles having a size not exceeding 5 microns, washing the calcined mixture first with mineral acid and then with water and finally calcining again for a further hour at a temperature between 1100° C. and 1400° C.

References Cited in the file of this patent

UNITED STATES PATENTS

| | | |
|---|---|---|
| 2,234,920 | Stillwell | Mar. 11, 1941 |
| 2,847,317 | Carnahan et al. | Aug. 12, 1958 |
| 2,875,085 | Morris et al. | Feb. 24, 1959 |

FOREIGN PATENTS

| | | |
|---|---|---|
| 1,058,919 | Germany | June 4, 1959 |

OTHER REFERENCES

Serial No. 324,184, Diehl (A.P.C.), published July 13, 1943.

Serial No. 368,408, Diehl (A.P.C.), published July 13, 1943.